Figure 2:
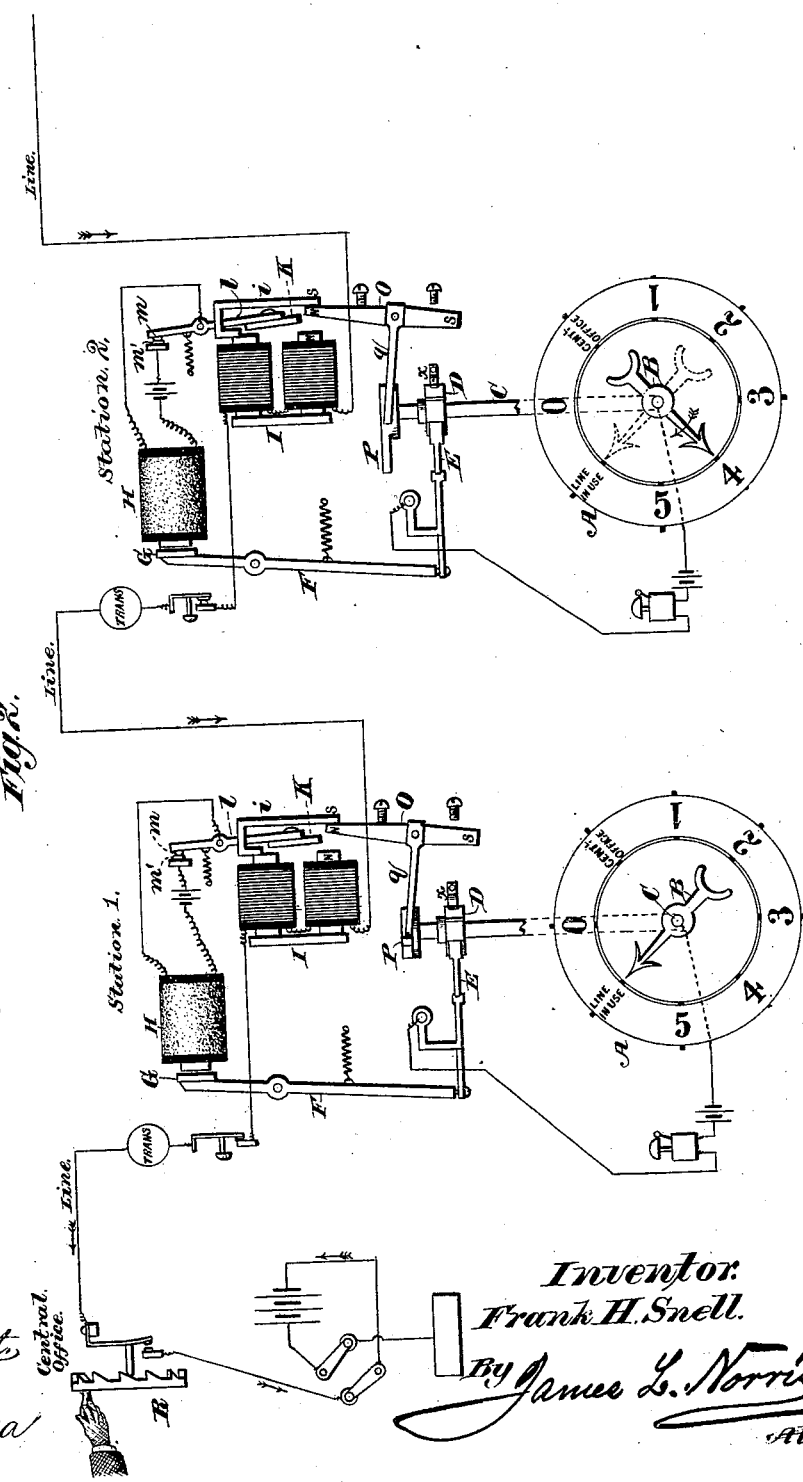

(No Model.) 3 Sheets—Sheet 1.
F. H. SNELL.
UNISON MECHANISM FOR ELECTRICAL INDICATORS.

No. 282,791. Patented Aug. 7, 1883.

Fig. 1.

Witnesses.
Robert Everett,
George W. Rea

Inventor.
Frank H. Snell.
By James L. Norris.
Atty.

(No Model.) 3 Sheets—Sheet 2.

F. H. SNELL.
UNISON MECHANISM FOR ELECTRICAL INDICATORS.

No. 282,791. Patented Aug. 7, 1883.

Witnesses.
Robert Everett,
George W. Rea

Inventor:
Frank H. Snell.
By James L. Norris.
Atty.

N. PETERS, Photo-Lithographer, Washington, D. C.

(No Model.)  3 Sheets—Sheet 3.

F. H. SNELL.
UNISON MECHANISM FOR ELECTRICAL INDICATORS.

No. 282,791. Patented Aug. 7, 1883.

Witnesses.
Robert Everett
George W. Rea

Inventor:
Frank H. Snell.
By James L. Norris.
Atty.

UNITED STATES PATENT OFFICE.

FRANK H. SNELL, OF WASHINGTON, DISTRICT OF COLUMBIA.

UNISON MECHANISM FOR ELECTRICAL INDICATORS.

SPECIFICATION forming part of Letters Patent No. 282,791, dated August 7, 1883.

Application filed February 28, 1883. (No model.)

*To all whom it may concern:*

Be it known that I, FRANK H. SNELL, a citizen of the United States, residing at Washington, in the District of Columbia, have invented new and useful Improvements in Unison Mechanism for Electric Indicators, of which the following is a specification.

This invention relates to mechanism for bringing to unison or coincidence a series of electro-magnetic indicators included in the same circuit, and has especially for its object the rectification of the operation of the signal-indicating instruments used at the stations in the subscribers' circuits of the automatic telephone exchange described and illustrated in Letters Patent No. 269,130, granted to me December 12, 1882. In that exchange system a series of signal-indicators are included in the same circuit at different stations, and when the indicator at any station is operated those at all the other stations should be similarly operated automatically by the same current; but it has been found that from various causes the pointers of some of the instruments will fail to move in unison with the others, and thus it happens that at various intervals the pointers of some instruments will be found giving incorrect indications. For instance, the proper indication being zero, (0,) one instrument in the circuit may be found pointing to 4, another to 3, and possibly others to different numerals. This comes, usually, from variations in the tension of the retracting or propelling springs, slipping of adjusting-screws, accumulation of dust in bearings or ratchets, imperfect lubrication, and other causes which have not been discovered. It is, as is well known, an evil attending all serial arrangement of step-by-step electro-magnetic instruments intended to work synchronously, and renders necessary the readjustment of the instruments at intervals in order to bring the pointers to a common starting-point, so that they may not become so widely different in indication as to become wholly unreliable.

My improved mechanism for bringing the indicators to unison consists in a novel construction and combination of devices which will be readily understood from the following description, with reference to the accompanying drawings, in which—

Figure 3:
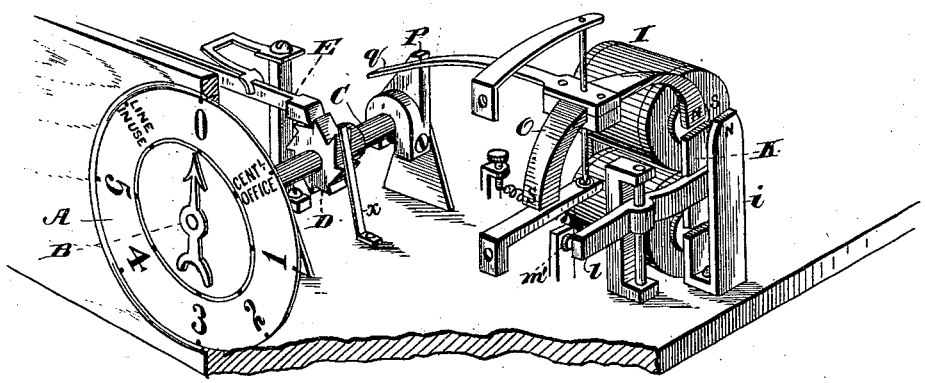
Figure 4:
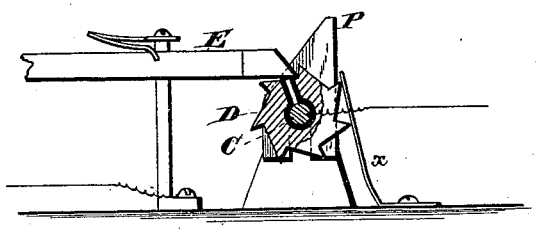

Figure 1 is a diagram illustrating a subscriber's line having a series of stations provided with indicators connected in the same circuit which leads from a battery at a central office. Fig. 2 is a similar diagram, showing the indicators in different positions. Fig. 3 is a perspective view illustrating a portion of the actual mechanical construction of an indicator with my improvement applied thereto.

The letter A designates the indicator-dials at the several stations, which are marked "Station No. 1" and "Station No. 2."

B B are the pointers, arranged in front of the dials, and carried by shafts C, upon which are fixed ratchet-wheels D, propelled by pawls E, attached to levers F, carrying armatures G, arranged for attraction by electro-magnets H. These magnets are arranged in local circuits, which are controlled by relay-magnets I, connected in the main line, and provided with armatures $k$, carried by levers $l$, having contact-points $m$, arranged to strike terminal contacts $m'$ of the local circuits.

At one side of each relay is pivoted a permanent magnet, O, having one of its poles arranged opposite one of the poles of the relay and in the normal direction of the current upon the line. The adjacent poles of the relay and the pivoted permanent magnet are different, the relay-pole being S and the other N, as shown in Fig. 1, so that the adjacent pole of the relay will attract the permanent magnet. The other pole of the relay is, however, extended, as shown at $i$, and bent to form an N-pole on the outside of the N-pole of the permanent magnet, and repels it to hold the permanent magnet in proper position.

Upon the end of the shaft C of the indicator is fixed a radial arm, P, and the pivoted permanent magnet O carries a laterally-projecting arm, $q$, the end of which may be swung into the path of arm P, but does not stand in its path normally. When, however, the direction of the current on the line is reversed, the poles of the relay and permanent magnet are changed, so that the relay-pole which was before S becomes N, and that which was N becomes S, and the permanent magnet is swung to the position shown in Fig. 2, thus bringing the free end of the arm $q$ in the path of the arm P, so that the pointer-shaft can revolve no farther after said arm P comes in contact with the arm $q$. Now, supposing the direction of the current on the line to be such as to polarize the relay, as shown in Fig. 1, which is the normal condition, the pointer-shaft may revolve freely, and the pointers being arranged at zero, any station may operate all the indicators by making and breaking the circuit. After awhile, however, the pointers are liable to get out of unison, as heretofore explained, and therefore at predetermined periods the operator at the central office proceeds to rectify the instruments on all the subscribers' lines. This he does by first reversing the current on the line, thus bringing the free ends of all the arms $q$ in the paths of all the arms P on the pointer-shafts, as before explained. He then makes and breaks the current by means of a current-breaker, R, a sufficient number of times to bring all the arms P into contact with the ends of the arms $q$, thus bringing the pointers all to the last indication preceding zero, this being in the present instance "line in use." Having reached this position it will be understood that the impelling-pawls E are all pressing against teeth of their ratchets D, and will impel these ratchets one step so soon as the arms P are released. The operator now again reverses the current to its normal direction, the permanent magnet O swings to the position shown in Fig. 1, taking the arms $q$ away from arms P, and the pawls impel these ratchets and the pointers one more step, bringing the latter to zero, from which they may be operated again in the ordinary manner.

The letter $x$ indicates a finger-spring bearing against the ratchet-wheel D. This spring serves to steady the movement of ratchet-wheel D to keep it from turning either too far or not far enough. The spring $x$ rests on a tooth above and another below the center of the ratchet D. When the ratchet tends to move too far, the pressure upon the tooth above the center will restore it, and when it does not move far enough the pressure upon the tooth below the center will carry it forward. The spring $x$ also serves to remove all friction between arms $q$ and P, when the current is restored to its normal condition and the arm $q$ turns out of the path of arm P. This is done as follows: The arm P is so placed upon the axle $c$ that when said arm comes in contact with arm $q$ the pawl E has caught the next tooth upon the ratchet and pressed it forward a little, thus putting a tension of the spring $x$ upon the tooth of the ratchet above the center. Then, when the circuit is again broken, the pawl is drawn away from the ratchet, and the spring $x$ (as before mentioned) will return the wheel D slightly, thus separating the parts P and $q$ by a considerable distance. When the circuit is again closed, with the current reversed, the parts P and $q$ will move simultaneously. Arm P will move forward and arm $q$ laterally out of its path without their coming into contact.

I am aware that in a unison mechanism heretofore constructed a stop lying normally in the path of a pin or projection on the face of a ratchet-wheel moved by an electro-magnet is moved from the path of said pin by the sending of a current of opposite polarity to that which is used to propel the wheel, and I do not claim such a mechanism.

Having now described my invention, what I claim is—

1. The combination of a magnet in the main circuit, a pawl-driving magnet arranged in a local circuit and controlled by the magnet before noted, the pawl, ratchet, and indicator-shaft arranged to rotate freely when the line-current is intermittently broken, and a stop adapted to arrest the said shaft at a predetermined point by the action of the line-magnet when the normal current of the line is reversed, substantially as described.

2. The combination, with a pawl-driving magnet in a local circuit, and having a neutral armature, a pawl, ratchet, and an indicator-shaft carrying a projecting arm, all controlled by said pawl-driving magnet, of a relay-magnet in the main circuit having a neutral armature controlling the local circuit, and a polarized armature controlling a stop adapted to be thrown into and out of the path of the projecting arm on the indicator-shaft, substantially as described.

3. The combination, with the indicator-shaft C, having ratchet D and projecting arm P, of the pawl E, lever F, and electro-magnet arranged to operate said lever, the relay arranged to control a local circuit which includes said pawl-driving magnet, the pivoted permanent magnet O, having one of its poles arranged between the poles of the relay-magnet and the arm projecting from said permanent magnet, and arranged to swing into and out of the path of the arm P of the indicator-shaft, substantially as described.

4. The combination, with the pawl-driving magnet and retractile pawl, the indicator-shaft carrying ratchet-wheel D and projecting arm P, and the arm $q$, arranged to swing into and out of the path of said projecting arm, of the spring $x$, arranged to bear against the teeth of the ratchet-wheel and move said wheel a limited distance in the opposite direction to its movement by the pawl, substantially as and for the purpose set forth.

In testimony whereof I have hereunto set my hand in the presence of two subscribing witnesses.

FRANK H. SNELL.

Witnesses:
JAMES L. NORRIS,
J. A. RUTHERFORD.